(12) United States Patent
Takeda et al.

(10) Patent No.: US 7,294,267 B2
(45) Date of Patent: Nov. 13, 2007

(54) HOLLOW FIBER MEMBRANE MODULE, HOLLOW FIBER MEMBRANE MODULE UNIT, MEMBRANE FILTRATION DEVICE USING THE SAME AND METHOD OF OPERATING THE SAME

(75) Inventors: Satoshi Takeda, Tokyo (JP); Masumi Kobayashi, Toyohashi (JP); Shinya Sueyoshi, Toyohashi (JP); Masatoshi Kamata, Otake (JP); Ikuo Kinoshita, Toyohashi (JP); Yoshihito Nakahara, Toyohashi (JP)

(73) Assignee: Mitsubishi Rayon Co., Ltd., Tokyo (JP)

( * ) Notice: Subject to any disclaimer, the term of this patent is extended or adjusted under 35 U.S.C. 154(b) by 0 days.

(21) Appl. No.: 11/087,593

(22) Filed: Mar. 24, 2005

(65) Prior Publication Data
US 2005/0161389 A1    Jul. 28, 2005

Related U.S. Application Data

(63) Continuation of application No. PCT/JP03/12335, filed on Sep. 26, 2003.

(30) Foreign Application Priority Data
Sep. 27, 2002 (JP) ............... 2002-283715

(51) Int. Cl.
*B01D 63/02* (2006.01)
(52) U.S. Cl. ............... 210/321.89; 96/8; 210/500.23
(58) Field of Classification Search ......... 210/321.69, 210/321.79, 321.8, 321.89, 321.9, 500.23, 210/636, 650, 321.75, 321.84; 96/4, 7–10
See application file for complete search history.

(56) References Cited

U.S. PATENT DOCUMENTS

| | | | | |
|---|---|---|---|---|
| 4,451,369 A | * | 5/1984 | Sekino et al. | 210/321.9 |
| 5,639,373 A | * | 6/1997 | Mahendran et al. | 210/636 |
| 5,922,201 A | * | 7/1999 | Yamamori et al. | 210/321.79 |
| 6,156,200 A | * | 12/2000 | Zha et al. | 210/321.89 |
| 6,319,411 B1 | * | 11/2001 | Cote | 210/636 |

(Continued)

FOREIGN PATENT DOCUMENTS

CN    2369748 Y    3/2000

(Continued)

*Primary Examiner*—Joseph Drodge
(74) *Attorney, Agent, or Firm*—Fitch, Even, Tabin & Flannery; Kendrew H. Colton

(57) ABSTRACT

A hollow fiber membrane module using a sheet-form hollow fiber membrane having excellent cleaning properties in which the pressure resistance of a hollow fiber membrane anchor section does not deteriorate, even when the membrane area increases; a hollow fiber membrane module unit using the module; a membrane filtration device using the unit; and an operation method therefor are provided. The hollow fiber membrane module comprises sheet-form hollow fiber membranes and an anchoring member which anchors the sheet-form hollow fiber membranes in a roughly parallel manner while maintaining in an open state at least one end portion of the sheet-form hollow fiber membranes. The shape of an end face of a side of the anchoring member from which the hollow fiber membranes are exposed is roughly rectangular, and the shape of an end face of a side of the anchoring member toward which the hollow fiber membranes open is roughly circular.

4 Claims, 6 Drawing Sheets

U.S. PATENT DOCUMENTS 6,511,602 B1 * 1/2003 Miyashita et al. .......... 210/636
2003/0111414 A1 * 6/2003 Baurmeister et al. ....... 210/641

FOREIGN PATENT DOCUMENTS

| CN | 2455348 Y | 10/2001 |
|----|-----------|---------|
| JP | 05-37328 U | 5/1993 |
| JP | 05-261254 A | 10/1993 |
| JP | 06-099038 A | 4/1994 |
| JP | 07-178320 A | 7/1995 |
| JP | 07-232040 A | 9/1995 |
| JP | 11-123319 A | 5/1999 |
| JP | 2000-051670 A | 2/2000 |
| JP | 2002-035553 A | 2/2002 |

* cited by examiner

HOLLOW FIBER MEMBRANE MODULE, HOLLOW FIBER MEMBRANE MODULE UNIT, MEMBRANE FILTRATION DEVICE USING THE SAME AND METHOD OF OPERATING THE SAME

CROSS-REFERENCE TO RELATED APPLICATIONS

This application is a continuation application of a PCT Application No. PCT/JP2003/12335, filed Sep. 26, 2003, whose priority is claimed on Japanese Patent Application No. 2002-283715, filed Sep. 27, 2002. The content of both the PCT Application and the Japanese Application is incorporated herein by reference.

BACKGROUND OF THE INVENTION

1. Field of the Invention

The present invention relates to a hollow fiber membrane module, a hollow fiber membrane module unit, a membrane filtration device (membrane filtration system) used for the purification of potable water supply, purification of waste water, industrial processes or the like, and to a method of operating the same.

2. Description of Related Art

Filtration of water by means of a membrane module has been employed in various applications due to its high separation performance, compact construction of the device and large-quantity and continuous processing capability.

There are different types of membrane modules such as microfiltration modules, ultrafiltration modules, and reverse osmosis modules, which are selected and operated in accordance with the material to be separated. For example, the microfiltration module can efficiently remove fine particles and microorganisms measuring 10 μm or smaller, particularly 1 μm or smaller, and is therefore commonly used in the purification of potable water supplies and waste water.

The microfiltration module is used in the form of a hollow fiber membrane module in which hollow fiber membranes are disposed in a cylindrical configuration or screen configuration, a pleated membrane module in which a flat membrane is folded in pleats in a cylindrical configuration or a planar membrane module in which a flat membrane is disposed in a screen configuration, in order to increase the membrane area and to make it easier to handle.

Among these, the hollow fiber membrane module allows it to provide a large membrane area per unit volume and is preferably used.

Use of the hollow fiber-based microfiltration membrane module in filtration enables it to remove suspended solids and bacteria or the like from water by means of micropores of the membrane and to produce clear filtered water. After a long period of continuous filtering operation, however, the micropores become clogged, resulting in a decrease in flow rate of the filtered water and an increase in the filtration pressure, thus making it necessary to frequently change the membrane module which is economically disadvantageous.

In order to prevent the membrane module from becoming clogged quickly by the membrane clogging matter contained in water, operations to restore the filtering function are carried out periodically such as, in the case of an external pressure-driven hollow fiber membrane module, for example, backwashing wherein filtered water is passed in a reverse direction from the inside to the outside of the hollow fiber membrane, scrubbing cleaning wherein the membrane is vibrated while supplying air to the outside of the hollow fiber membrane, or a combination of these cleaning operations is carried out, thereby removing the membrane-clogging matter deposited on the outside of the hollow fiber membrane.

While the membrane area of the hollow fiber membrane module can be increased by increasing the number of hollow fiber membranes per unit volume, increasing the membrane area by disposing the hollow fiber membranes bundled in cylindrical configuration makes it difficult to flow the scrubbing air or backwash water for cleaning, resulting in decreasing effect of cleaning. This problem can be avoided by disposing the hollow fiber membranes with equal spacing from each other in the form of sheets, which enables uniform cleaning of the membrane surface and makes it applicable also to the filtration of heavily contaminated water.

The hollow fiber membrane module is also used in large-scale purification plants having processing capacity over 10,000 $m^3/d$, in the case of potable water purification. In such an application, a large number of hollow fiber membrane modules are used to secure a large membrane area. For example, when arranging the hollow fiber membrane modules to form a unit, how close the hollow fiber membrane modules can be arranged to each other is restricted by the sizes and configurations of the anchoring members and the water collection section provided at the ends of the hollow fiber membrane modules.

There has been proposed such a hollow fiber membrane module that satisfies the relationship $100 \geq A/B \geq 1.2$, where it is assumed that the hollow fiber membranes are anchored while being left open at one end or both ends thereof by anchoring members provided in a housing, the area of a surface of the anchoring member is A on the side where the hollow fiber membrane is exposed from the anchoring member, and the area of an end face of the anchoring member is B on the side where the hollow fiber membrane opens (refer to Japanese Unexamined Patent Publication, First Publication No. H07-178320).

This module is assembled by anchoring sheet-form hollow fiber membranes with anchoring members that are molded in elongated rectangular shape. Since width of the anchoring member on the side where the hollow fiber membrane is exposed is larger than the outer diameter of the water collecting tube and larger than the joint, and the water collecting tubes and other members do not interfere with each other, the modules can be disposed in parallel arrangement so that side faces of the anchoring members make contact with each other. As a result, the entirety of the hollow fiber membranes can be cleaned evenly by scrubbing without significant decrease in the density of the hollow fiber membranes.

Higher density of the hollow fiber membranes and lower processing cost per unit area of the hollow fiber membrane can be achieved when the number of the sheet-form hollow fiber membranes fastened onto one anchoring member is larger. However, the number of the hollow fiber membranes that can be fastened onto one anchoring member that is formed in elongated rectangular shape is limited. On the other hand, there is a problem in that increasing the width of the rectangular anchoring member for the purpose of increasing the number of the hollow fiber membranes that can be fastened causes the withstand pressure to drastically decrease.

There is also known a hollow fiber membrane module that has a constitution of a plurality of sheet-form hollow fiber membranes arranged and fastened by an anchoring member onto the end of a cylindrical housing, so that a proper spacing is secured between the sheet-form hollow fiber membranes so as to be efficiently cleaned while increasing the density of the hollow fiber membranes (for example, refer to Japanese Unexamined Patent Publication, First Publication No. 2000-51670).

In this module, however, since the sheet-form hollow fiber membranes are arranged in the cylindrical housing, the width of the sheet-form hollow fiber membrane fastened at the end becomes smaller than that at the center of the cylinder resulting in lower density of the hollow fiber membranes.

There is also known a hollow fiber membrane module having a constitution of a bundle of hollow fiber membranes divided into a plurality of segments and are expanded and fastened onto a support body at a position near the center between potting sections-on both ends, thereby improving the efficiency of cleaning (for example, refer to Japanese Unexamined Patent Publication, First Publication No. H06-99038).

In this module, however, since the hollow fiber membranes are expanded and fastened onto the support body near the center between potting sections on both ends, density of the hollow fiber membranes becomes lower and it becomes difficult to clean the portion near the potting sections.

When the hollow fiber membrane modules are used in a large-scale purification plant, a large number of hollow fiber membrane modules are installed in a submerging water tank in order to increase the membrane area. The hollow fiber membrane modules are disposed in a configuration made up of multiple columns and multiple rows in order to make efficient use of the space in the submerging water tank.

However, this constitution requires a large space for piping and servicing, resulting in a dead space that cannot be efficiently used. As a result, unnecessarily large quantity of washing water is discharged during periodic cleaning operations, thus resulting in lower ratio of recovering of water.

The present invention has been made to solve the problems described above and an object thereof is to provide a hollow fiber membrane module comprising sheet-form hollow fiber membranes that can be easily cleaned, wherein withstand pressure of the hollow fiber membrane anchoring section does not decrease even when the membrane area is increased, and a hollow fiber membrane module unit having high density of hollow fiber membranes. Another object of the present invention is to provide a membrane filtration device that employs the hollow fiber membrane module unit described above and a method of operating the same.

SUMMARY OF THE INVENTION

A first aspect of the present invention is a hollow fiber membrane module comprising: a plurality of sheet-form hollow fiber membranes (1); and an anchoring member (2) that fastens the plurality of sheet-form hollow fiber membranes (1) substantially parallel to each other while leaving at least one end of the sheet-form hollow fiber membranes (1) open, wherein an end face of the anchoring member (2) on a side where the hollow fiber membranes are exposed is substantially rectangular, and an end face of the anchoring member (2) on a side where the hollow fiber membranes open is substantially circular.

In the hollow fiber membrane module according to the first aspect of the present invention, since the end face of the anchoring member (2) on the side where the hollow fiber membranes are exposed is substantially rectangular, and the end face of the anchoring member (2) on the side where the hollow fiber membranes open is substantially circular, withstand pressure of the hollow fiber membrane anchoring section does not decrease even when the membrane area is increased in the module that employs the sheet-form hollow fiber membranes which can be cleaned efficiently.

It is preferable that the anchoring member (2) comprise a rectangular parallelepiped section (3) of substantially rectangular parallelepiped shape on the side where the hollow fiber membranes are exposed, and a cylindrical section (4) of substantially cylindrical shape on the side where the hollow fiber membranes open, since such a configuration improves all of withstand pressure, efficiency of cleaning, and density of the hollow fiber membranes.

It is more preferable that the relationship $0.2 \leq L/D \leq 1.0$ be satisfied where D (mm) is a diameter of the cylindrical section (4) and L (mm) is a length of the cylindrical section (4).

Furthermore, it is more preferable that the relationship $1.0 \leq W/D \leq 2.0$ be satisfied where W (mm) is a length of the longer side of an end face of the rectangular parallelepiped section (3) where the hollow fiber membranes are exposed and D (mm) is a diameter of the cylindrical section (4).

A second aspect of the present invention is a hollow fiber membrane module unit comprising a plurality of hollow fiber membrane modules, wherein a plate-like member (5) having a hole through which the cylindrical section (4) passes is provided on a side of the sheet-form hollow fiber membranes (1) perpendicular to sheet surfaces, so that the hollow fiber membrane modules are secured in place by the plate-like member (5).

In the hollow fiber membrane module unit according to the second aspect of the present invention, since the plate-like member (5) having the hole through which the cylindrical section (4) passes is provided, and the hollow fiber membrane modules are secured in place by the plate-like member (5), anchoring is achieved easily and reliably, and a high density of the hollow fiber membranes can be achieved.

It is preferable that the cylindrical section (4) and a water collecting cap (6) that engages with the cylindrical section (4) sandwich and fasten the plate-like member (5), so that anchoring is achieved easily and reliably.

It is preferable that the cylindrical section (4) and the water collecting cap (6) be fastened to each other by screw engagement since this allows easy dismantling.

Furthermore, it is preferable that a plurality of hollow fiber membrane module units be stacked in the vertical direction, the sheet surface of the sheet-form hollow fiber membranes (1) be disposed in the vertical direction, and water collecting caps (6) that adjoin each other in the vertical direction be connected to each other by a water collecting member (7) that extends in the vertical direction, and a side frame (21) be disposed on a side face parallel to the sheet surfaces of the sheet-form hollow fiber membranes (1), since this configuration allows it to increase the density of the hollow fiber membranes with a smaller installation area.

With this configuration, it is preferable that vertical distance between the sheet-form hollow fiber membranes (1) of the hollow fiber membrane module adjacent to each other in the vertical direction be 70 mm or less, so that the hollow fiber membranes can be cleaned efficiently.

A third aspect of the present invention is a membrane filtration device comprising a membrane module unit disposed in a water tank, wherein the membrane module unit comprises a plurality of hollow fiber membrane modules, each of the hollow fiber membrane modules comprises: a plurality of sheet-form hollow fiber membranes (1); and an anchoring member (2) that fastens the plurality of sheet-form hollow fiber membranes (1) substantially parallel to each other while leaving at least one end of the sheet-form hollow fiber membranes (1) open, and an end face of the anchoring member (2) on a side where the hollow fiber membranes are exposed is substantially rectangular, and an end face of the anchoring member (2) on a side where the hollow fiber membranes open is substantially circular, and the following three relationships are satisfied where S (m$^2$) is the membrane area of the membrane module unit, A (m$^2$) is the area of projection of the membrane module unit, V' (m$^3$) is the volume of the membrane module unit, and V (m$^3$) is the capacity of the water tank:

$$1000 \leq S/A \leq 2000 \quad \text{Equation (1)}$$

$$500 \leq S/V' \leq 800 \quad \text{Equation (2)}$$

$$0.70 \leq V'/V \leq 0.99 \quad \text{Equation (3)}.$$

A fourth aspect of the present invention is a method of operating a membrane filtration device comprising a membrane module unit disposed in a water tank, the method comprising the steps of: forming the membrane module unit by a plurality of hollow fiber membrane modules; forming the hollow fiber membrane modules such that a plurality of sheet-form hollow fiber membranes (1) are fastened substantially parallel to each other by an anchoring member (2) with at least one end of the sheet-form hollow fiber membranes (1) being left open, while an end face of the anchoring member (2) on a side where the hollow fiber membranes are exposed is substantially rectangular, and an end face of the anchoring member (2) on a side where the hollow fiber membranes open is substantially circular; setting S (m$^2$), being a membrane area of the membrane module unit, J (m/d), being a filtration flux, T (h), being the filtration time, N, being the number of cycles per draining of water, D (m$^3$), being the volume of draining, J' (m/d), being the backwash flux, and T' (h), being the backwash time so as to satisfy the following relationship N≧22.8D/{S (0.05JT−J'T')} Equation (4); and operating the membrane filtration device.

The membrane filtration device of the present invention that has the constitution described above and is operated by the method described above has a large membrane area despite having a very compact construction and high efficiency of cleaning, and is therefore capable of carrying out stable filtering operation over an extended period of time.

DETAILED DESCRIPTION OF THE INVENTION

The present invention will now be described in detail with reference to the accompanying drawings.

Figure 1:
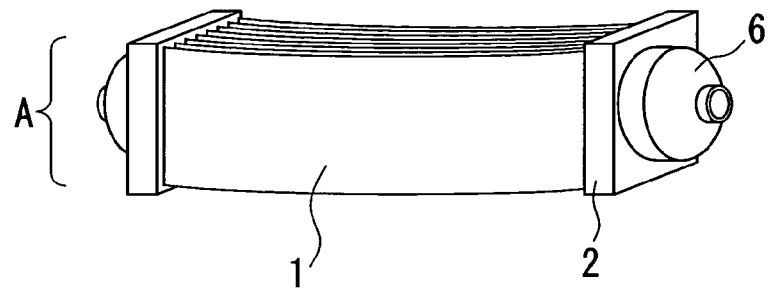
FIG. 1 is a perspective view of an example of a hollow fiber membrane module of the present invention.

FIG. 1 is a perspective view of an example of hollow fiber membrane module of the present invention.

The hollow fiber membrane module (A) is substantially constituted from sheet-form hollow fiber membranes (1), anchoring members (2), and water collecting caps (6). A plurality of the sheet-form hollow fiber membranes (1) are disposed in parallel to each other at equal intervals with both ends thereof being left open and secured by the anchoring members (2), while the water collecting caps (6) are mounted on the anchoring members (2).

Figure 2:
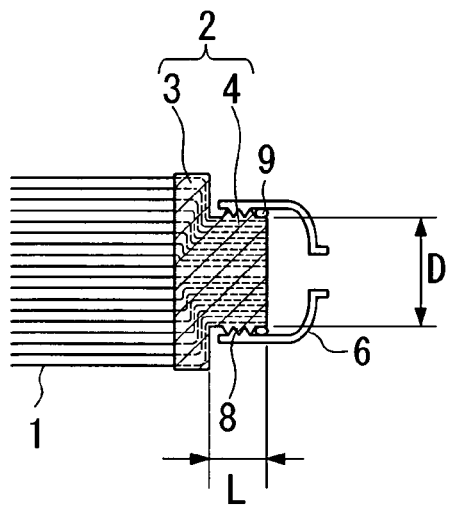
FIG. 2 is a sectional view of an example of anchoring member of the hollow fiber membrane module of the present invention.

FIG. 2 shows an example of the hollow fiber membrane anchoring section of the hollow fiber membrane module of the present invention, in a sectional view perpendicular to the direction of the sheet surface of the sheet-form hollow fiber membrane.

A plurality of the sheet-form hollow fiber membranes (1) are disposed in parallel to each other at equal intervals with the end thereof being secured by the anchoring member (2).

The end face of the anchoring member (2) on the side where the sheet-form hollow fiber membrane (1) is exposed is substantially rectangular, and the end face of the anchoring member (2) on the side where the hollow fiber membrane opens is substantially circular. In the case in which the end face of the anchoring member (2) on the side where the sheet-form hollow fiber membrane (1) opens is cylindrical, far higher withstand pressure can be achieved since deflection is smaller than in the case of rectangular parallelepiped shape and stress is distributed. Thus, all of the withstand pressure, efficiency of cleaning, and density of hollow fiber membranes can be improved with this configuration, even when a large number of sheet-form hollow fiber membranes are disposed.

In this case, the anchoring member (2) may be formed in such a shape that changes continuously from the side where the sheet-form hollow fiber membrane (1) is exposed toward the opening end. However, the following three conspicuous effects can be achieved at the same time by forming the anchoring member (2) in a constitution that has a rectangular parallelepiped section (3) of substantially rectangular parallelepiped shape on the side where the hollow fiber membrane is exposed, and a cylindrical section (4) of substantially cylindrical shape on the side where the hollow fiber membrane opens, as shown in FIG. 1 and FIG. 2.

1. A large number of sheet-form hollow fiber membranes (1) can be anchored while maintaining a space from each other on the rectangular parallelepiped section (3) of one anchoring member (2), and therefore efficient cleaning is ensured.

2. Very high density of the hollow fiber membranes can be achieved by disposing a plurality of the hollow fiber membrane modules (A) in such an arrangement as the side faces of adjacent rectangular parallelepiped sections (3) are in contact with each other, thereby eliminating unnecessary space.

3. Very high withstand pressure can be achieved since the anchoring member (2) has the cylindrical section (4) on the side thereof where the hollow fiber membrane opens.

The cylindrical section (4) of the anchoring member (2) may not necessarily have perfectly circular cross section perpendicular to the central axis of the cylinder, and may be oval, modified oval, polygonal that is approximates a circle such as a dodecagon or hexadecagon, while a circular cross section is most preferable.

It is preferable that the relationship $0.2 \leq L/D \leq 1.0$ be satisfied where D (mm) is a diameter of the cylindrical section (4) and L (mm) is a length of the cylindrical section in the axial direction thereof.

Withstand pressure of the hollow fiber membrane anchoring section is heavily dependent on the value of L/D of the cylindrical section (4). The value of L/D less than 0.2 leads to insufficient withstand pressure, and therefore the lower limit of L/D is 0.2 or larger, preferably 0.25 or larger. The value of L/D larger than 1.0 leads to an increase in loss in an effective section of the hollow fiber membrane, and therefore an upper limit of L/D is 1.0 or less, and preferably 0.8 or less.

When the cross section of the cylindrical section (4) is not a true circle, diameter D of the cylindrical section (4) refers to the largest size across the cross section.

While sizes L and D of the cylindrical section (4) may be set in accordance with the size of the hollow fiber membrane module, it becomes difficult to install the sheet-form hollow fiber membranes (1) when D is too small. Thus, a lower limit of D is preferably 30 mm or larger, and more preferably 50 mm or larger. When D is too large, it is difficult to process the module and withstand pressure may become insufficient. Thus, an upper limit of D is 400 mm or less, and more preferably 300 mm or less.

When L is too small, a withstand pressure becomes insufficient, and therefore a lower limit of L is preferably 10 mm or larger, and more preferably 50 mm or larger. When L is too large, a loss in an effective section of the hollow fiber membrane increases and resistance to passing water increases. Therefore an upper limit of L is 300 mm or less, more preferably 200 mm or less.

Figure 3:
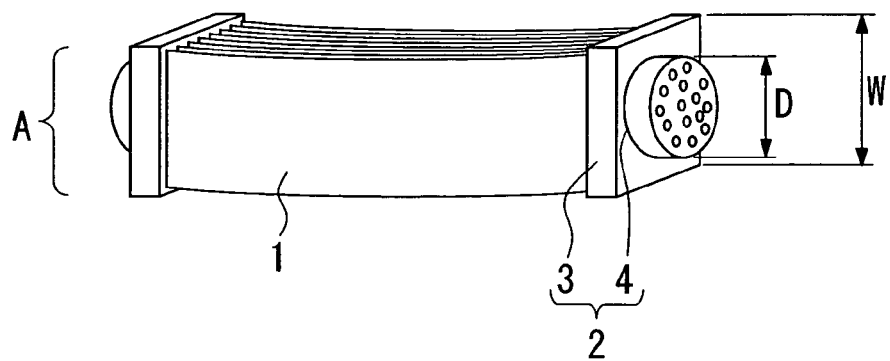
FIG. 3 is a perspective view of an example of the anchoring member of the hollow fiber membrane module of the present invention.

FIG. 3 is a perspective view of an example of the hollow fiber membrane anchoring section for the hollow fiber membrane module of the present invention. The hollow fiber membrane module (A) of the present invention satisfies the relationship $1.0 \leq W/D \leq 2.0$ where W (mm) is a length of the longer side of the end face where the hollow fiber membrane is exposed and D (mm) is a diameter of the cylindrical section (4).

Increasing the value of W relative to D enables it to increase the membrane area of the hollow fiber membrane module without decreasing the withstand pressure of the hollow fiber membrane anchoring section. When the value of W/D is too large, however, the sheet-form hollow fiber membrane is drawn too tightly, thus making it difficult to arrange the sheet-form hollow fiber membranes. This results in a problem that effective length of the hollow fiber membrane varies among the sheet-form hollow fiber membranes. Among the sheet-form hollow fiber membranes stacked one on another, those located outside have a problem that the longer portion of the hollow fiber membrane is embedded in the rectangular parallelepiped section (3), thus resulting in increasing resistance against passing water. Therefore, an upper limit of W/D is 2.0 or less, and is preferably 1.8 or less.

When the value of W/D is too small, the withstand pressure decreases, although it becomes easier to process. Therefore, a lower limit of W/D is 1.0 or larger and preferably 1.2 or larger.

While the value of W may be set in accordance with the membrane area of the hollow fiber membrane module, it becomes difficult to ensure sufficiently large membrane area of the module when W is too small. Therefore, a lower limit of W is at least 40 mm, and preferably at least 80 mm.

When the value W is too large, it becomes difficult to process the module. Therefore, an upper limit of W is 500 mm or less, and is preferably 400 mm or less.

In FIG. 3, the size W is shown as the height in the case in which the rectangular parallelepiped section (3) is larger in height than in width. In the case in which width (dimension in the direction where the sheet-form hollow fiber membranes are stacked) is larger than height, W represents the width.

The length of the rectangular parallelepiped section (3) in the axial direction of the fiber of the hollow fiber membrane may be set appropriately since the configuration of arrangement of the hollow fiber membranes varies depending on the effective length and outer diameter of the hollow fiber membrane, width of the sheet-form hollow fiber membrane and other factors. When the length of the rectangular parallelepiped section (3) in the axial direction of the fiber of the hollow fiber membrane is too small; however, it becomes difficult to converge the plurality of sheet-form hollow fiber membranes having rectangular parallelepiped shapes that are disposed at equal intervals into cylindrical shape. Therefore, a lower limit for the length of the rectangular parallelepiped section (3) in the axial direction of fiber of the hollow fiber membrane is preferably 5 mm or larger, and more preferably 10 mm or larger.

When the length of the rectangular parallelepiped section (3) in the axial direction of the fiber of the hollow fiber membrane is too large, a loss in the effective section of the hollow fiber membrane increases and portions that do not contribute to the filtration increase resulting in increasing resistance against passing water. Therefore, an upper limit for the length of the rectangular parallelepiped section (3) in the axial direction of the fiber of the hollow fiber membrane is 100 mm or less, preferably 70 mm or less and more preferably 50 mm or less.

In order to collect the filtrate discharged from the hollow fiber membrane, the water collecting cap (6) is provided on the cylindrical section (4). The water collecting cap (6) is preferably installed by bringing threads (8) formed on the circumference of the cylindrical section (4) and threads (8) formed in the water collecting cap (6) into mesh with each other while sealing by means of a sealing member (9) such as an O-ring, as this allows easy dismantling and reliable sealing.

Figure 4:
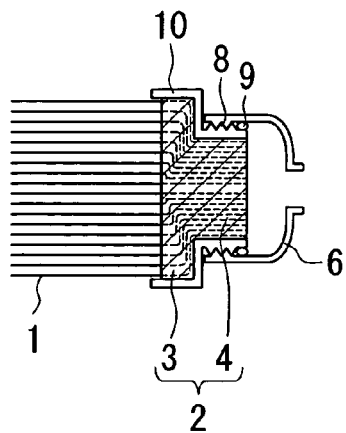
FIG. 4 is a sectional view showing another example of the anchoring member of the hollow fiber membrane module of the present invention.

FIG. 4 shows another example of the hollow fiber membrane anchoring member of the hollow fiber membrane module of the present invention, in a sectional view along a direction perpendicular to a sheet surface of the sheet-form hollow fiber membrane.

In this example, the sheet-form hollow fiber membrane (1) is fastened by the anchoring member (2) in the housing (10).

In the case in which the housing (10) is provided as in the example shown in FIG. 4, too, dimensions (D), (L), and (W) are determined with reference to the size of the anchoring member (2), similarly to the case without the housing (10).

In the case in which the housing (10) is provided, too, the water collecting cap (6) may be installed by bringing the threads (8) formed on the circumference of the cylindrical section (4) and the threads (8) formed in the water collecting cap (6) into mesh with each other while sealing by means of the sealing member (9) such as an O-ring. The water collecting cap (6) may also be integrated with the housing (10). Alternatively, the water collecting cap (6) may be bonded onto the anchoring member (2).

The hollow fiber membrane module of the present invention preferably employs such a constitution as both ends of the sheet-form hollow fiber membrane (1) are fastened by separate anchoring members (2). When the hollow fiber membrane module is used in such a manner as raw water is supplied from the outside of the hollow fiber membrane and treated water is taken out from the inside of the hollow fiber membrane, there is a problem that resistance against passing water within the hollow fiber membrane increases as the effective length of the hollow fibers becomes longer. With such a structure as shown in FIG. 1 where water is collected from both ends of the hollow fiber membrane, resistance against passing water can be decreased and the effective length of the hollow fibers can be increased. When the hollow fiber membrane modules are assembled into a unit, it becomes easier to support by securing both ends with the anchoring members (2).

Figure 5:
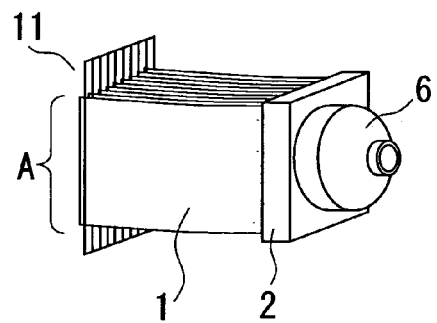
FIG. 5 is a perspective view showing another example of the hollow fiber membrane module of the present invention.

FIG. 5 is a perspective view showing another example of the hollow fiber membrane module of the present invention. The hollow fiber membrane module (A) of this example roughly comprises the sheet-form hollow fiber membranes (1), the anchoring member (2), the water collecting cap (6), and supporting member (11). The sheet-form hollow fiber membranes (1) are disposed in parallel at equal spacing from each other on the anchoring member (2), and are secured by the anchoring member (2) at one end thereof and are supported by the supporting member (11) at the other end. The water collecting cap (6) is mounted on the anchoring member (2).

There are no restrictions on the structure and other features of the supporting member (11), as long as it can support the sheet-form hollow fiber membranes (1) in parallel at equal spacing from each other. For example, the entire structure may be consolidated by applying a resin, or the hollow fiber membranes may be secured by means of a member that has rod-like or thread-like shape. Furthermore, the hollow fiber membranes may be bent at the center in a U-shape, and secured at the bend by the supporting member (11).

Such a constitution wherein water is collected only on one end can be applied to a case where effective length of the hollow fiber membrane is small or the hollow fiber membrane has a large diameter.

When a large quantity of water is to be treated, it is preferable to assemble a plurality of hollow fiber membrane modules into a hollow fiber membrane module unit which is easier to handle. In this case, it is preferable to construct the hollow fiber membrane module unit with the density of the hollow fiber membranes as high as possible without compromising the ease of cleaning.

Figure 6:
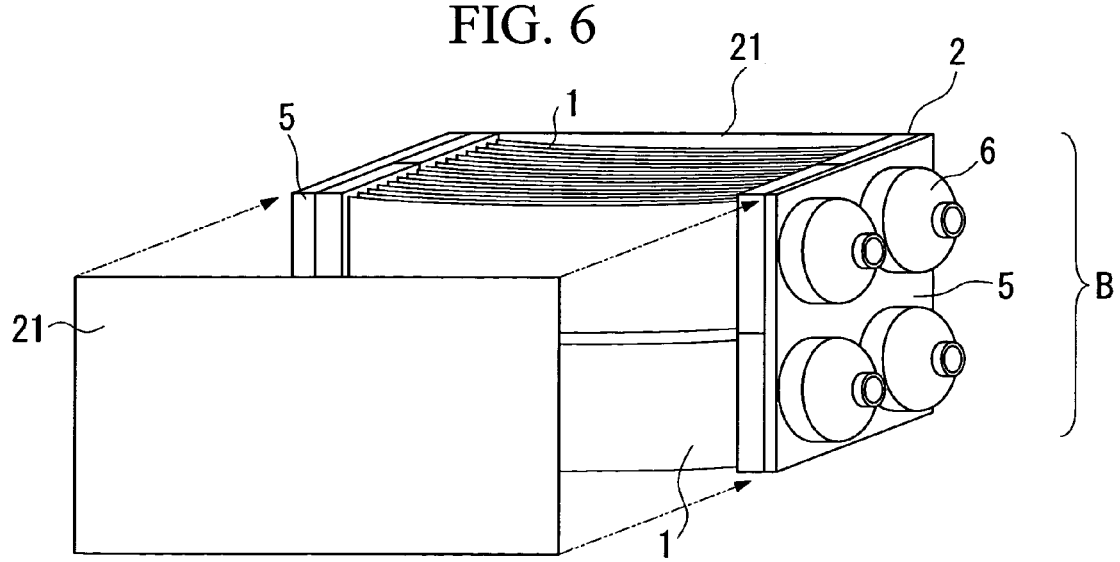
FIG. 6 is a perspective view showing an example of hollow fiber membrane module unit of the present invention.

FIG. 6 is a perspective view showing an example of the hollow fiber membrane module unit of the present invention.

The hollow fiber membrane module unit (B) roughly comprises hollow fiber membrane modules (A), plate-like members (5), water collecting caps (6) and side frames (21).

The plate-like member (5) has four holes formed therein. With the cylindrical section (4) inserted into this hole so that the sheet surface of the hollow fiber membrane module (A) is disposed in the vertical direction and the axial direction of the fiber of the hollow fiber membranes agrees with the horizontal direction, while the water collecting cap (6) is attached to the protruding cylindrical section (4), the hollow fiber membrane module (A) can be fastened by the plate-like member (5).

Figure 7:
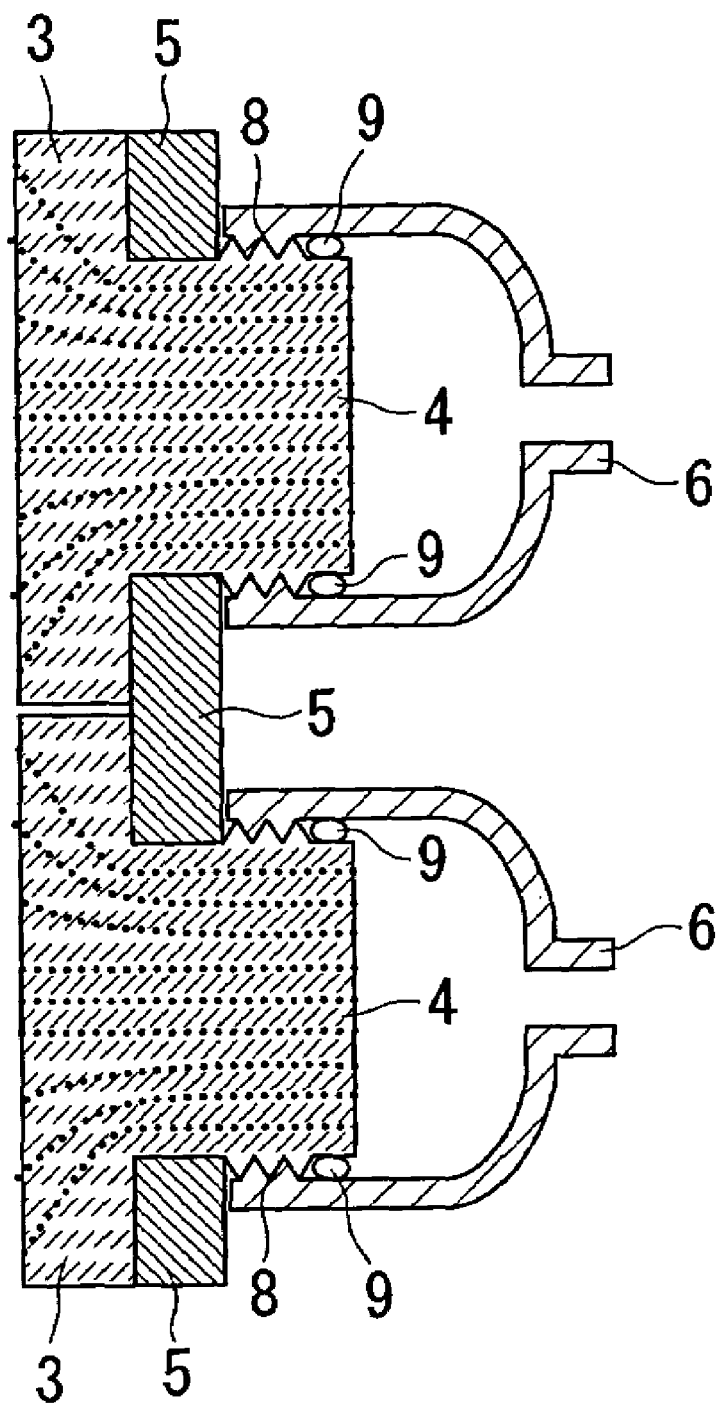
FIG. 7 is a sectional view showing an example of the anchoring section of the hollow fiber membrane module unit of the present invention.

The water collecting cap (6) can be attached easily and reliably by means of screw engagement between threads (8) formed on the cylindrical section (4) and on the water collecting cap (6), as described previously. In this case, as shown in FIG. 7, the water collecting cap (6) and the plate-like member (5) can be used to position and fasten the hollow fiber membrane module (A) in place by making the water collecting cap (6) larger than the hole formed in the plate-like member (5).

Four hollow fiber membrane modules (A) are fastened onto the plate-like member (5), and the side frames (21) are attached on both sides of the sheet-form hollow fiber membrane (1) along the sheet surface, thereby assembling the hollow fiber membrane module unit (B).

While the hollow fiber membrane module unit (B) of the example shown in FIG. 6 consists of four hollow fiber membrane modules (A), the number may be adjusted as required.

The side frame (21) has a function to maintain the shape of the hollow fiber membrane module unit (B) and a function to concentrate the hollow fiber membranes without allowing the scrubbing air to leak to the outside.

The side frame (21) may be a plate that has sufficient rigidity and strength made of stainless steel or the like, but it is more preferable to use a frame made of stainless steel or the like having plates made of resin or light alloy, which makes the structure light in weight while maintaining strength. It is more preferable to use transparent resin plates so that the hollow fiber membrane modules can be seen from the outside, thus making it possible to check if the modules kept clean.

The hollow fiber membrane modules (A) are assembled into a unit without clearance from each other so as to make contact with each other on the rectangular parallelepiped sections (3) of the anchoring member (2), thus making it possible to supply scrubbing air uniformly throughout the unit.

The hollow fiber membrane module units (B) assembled as described above can be arranged in plurality in the vertical direction or horizontal direction and integrated, so that the area of the hollow fiber membranes can be readily adjusted in accordance with the processing capacity.

Figure 8:
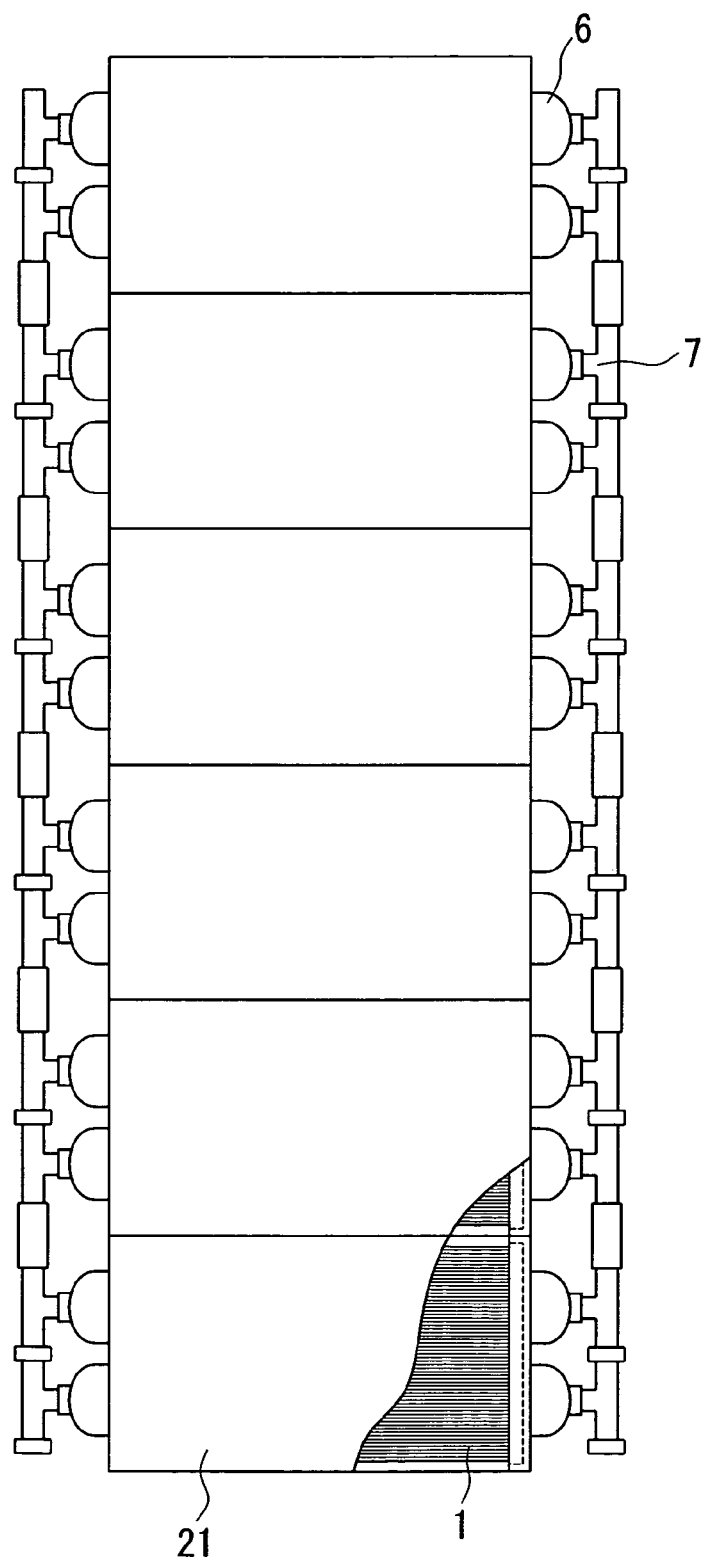
FIG. 8 is a front view showing an example of the hollow fiber membrane module unit of the present invention stacked in the vertical direction.

In this case, it is preferable to stack a plurality of the hollow fiber membrane module units (B) in the vertical direction as shown in FIG. 8 to integrate the units in order to increase the density of the hollow fiber membranes per unit area, although there is a limitation by the depth of the submerging water tank in which the hollow fiber membrane module units (B) are disposed. The hollow fiber membrane module units (B) are stacked in, for example, 2 to 10 levels. In the case in which the hollow fiber membrane module units (B) are immersed in coagulation-sedimentation basin of a purification plant, the stacking level is preferably from 4 to 6.

Assembly of the hollow fiber membrane module units stacked in the vertical direction may also be disposed in plurality in the submerging water tank as required.

When plural hollow fiber membrane module units (B) are stacked in the vertical direction, if vertical spacing between the sheet-form hollow fiber membranes (1) of adjacent hollow fiber membrane modules is too large, streams of scrubbing air tend to converge and form a thick stream, after hitting the membrane surface of the hollow fiber membrane module located below and while rising over the membrane surface of the hollow fiber membrane module located above. This leads to weaker effect of diffusion, and uniform effect of cleaning the membrane surface cannot be ensured for hollow fiber membrane module located at a higher position.

For this reason, vertical spacing between the sheet-form hollow fiber membranes (1) is set to 70 mm or less, preferably 60 mm or less. With this construction, after hitting the membrane surface of the hollow fiber membrane module located at a low position, the scrubbing air rises to the membrane surface of the hollow fiber membrane module located above while maintaining diffusion. As a result, cleaning performance is not compromised even when the plurality of hollow fiber membrane modules are stacked in the vertical direction.

The vertical spacing between the sheet-form hollow fiber membranes (1) herein refers to the distance between the bottom end of the anchoring section of the sheet-form hollow fiber membrane (1) of the hollow fiber membrane module located above and the top end of the anchoring section of the sheet-form hollow fiber membrane (1) of the hollow fiber membrane module located just below, and does not mean the distance between the portions that move during vibration movement of air scrubbing.

A lower limit of the vertical spacing between the sheet-form hollow fiber membranes (1) is preferably 20 mm or larger, and more preferably 30 mm or larger, since the hollow fiber membranes may be entangled to make it difficult to clean when the distance is too small.

When a plurality of hollow fiber membrane module units (B) are stacked in the vertical direction, it is necessary to collect the filtrate from different water collecting caps (6) and discharge it. It is preferable to connect the water collecting caps (6) with each other by means of the water collecting members (7) that extend in the vertical direction, for easy connection in compact construction.

For the water collecting members (7), union joint, flange joint, T-joint, flexible hose, coupling or the like may be used to connect the water collecting cap (6) and the water collecting members (7), or between a plurality of the water collecting members (7).

The water collecting members (7) may be made of any material that has sufficient mechanical strength and durability, such as polycarbonate resin, polysulfone resin, acrylic resin, ABS resin, modified PPE (polyphenylene ether), vinyl chloride resin, polyolefin resin (polypropylene, polyethylene, etc.) and metals such as stainless steel, bronze, brass, and cast steel.

The anchoring member (2) used in the hollow fiber membrane module of the present invention may be made of a material that has sufficient bonding strength with the hollow fiber membrane and the housing (10) and satisfies the requirements of the application, including thermosetting resins such as polyurethane resin, epoxy resin, silicon resin or unsaturated polyester resin and thermoplastic resins such as polyurethane resin, ethylene-vinyl acetate copolymer or polyolefin resin. The hollow fiber membrane may be anchored by known methods such as pouring a thermoplastic resin that is melted by heating or applying a thermosetting resin by means of centrifugal force or gravity.

When the housing (10) is used, it may be made of a material that satisfies the requirements of the application such as polyolefine, polycarbonate, modified polyphenylene oxide, ABS and polyvinyl chloride. A material that bonds with the anchoring member (2) with insufficient strength may be used after applying priming treatment.

There are no restrictions on the kind of material, pore size, void ratio, membrane thickness, outer diameter, and other properties of the hollow fiber membrane used in the hollow fiber membrane module of the present invention. For example, the hollow fiber membrane may be made of polyolefin, polysulfone, polyvinyl alcohol, cellulose, polyacrylonitrile, polyamide, polyimide, polytetrafluoroethylene, polyvinylidene fluoride, or the like.

When the hollow fiber membranes are woven in order to process them to form a sheet-like structure, a material that has high elongation property is preferably used such as polyethylene or polypropylene since it is easy to perform processing.

When the hollow fiber membrane made of hydrophobic material is used in the filtration of water, the hollow fiber membrane may be applied to make it hydrophilic.

The hollow fiber membrane may have, for example, a pore size in a range from 0.001 to 3 µm, a void ratio from 20 to 95%, a membrane thickness from 5 to 500 µm, and an outer diameter from 20 to 3000 µm.

The hollow fiber membrane module (A) of the present invention comprises a plurality of the sheet-form hollow fiber membranes (1) disposed in parallel to each other at equal intervals. While there is no restriction on the method of arranging the hollow fiber membranes in the sheet configuration, a hollow fiber membrane sheet woven into sheet configuration is preferably used. Spacing between the sheet-form hollow fiber membranes may be set in a range, for example, from 2 to 100 mm, depending on the properties of the raw water. The number of the sheet-form hollow fiber membranes may also be set in accordance with the membrane area of the module.

Figure 9:
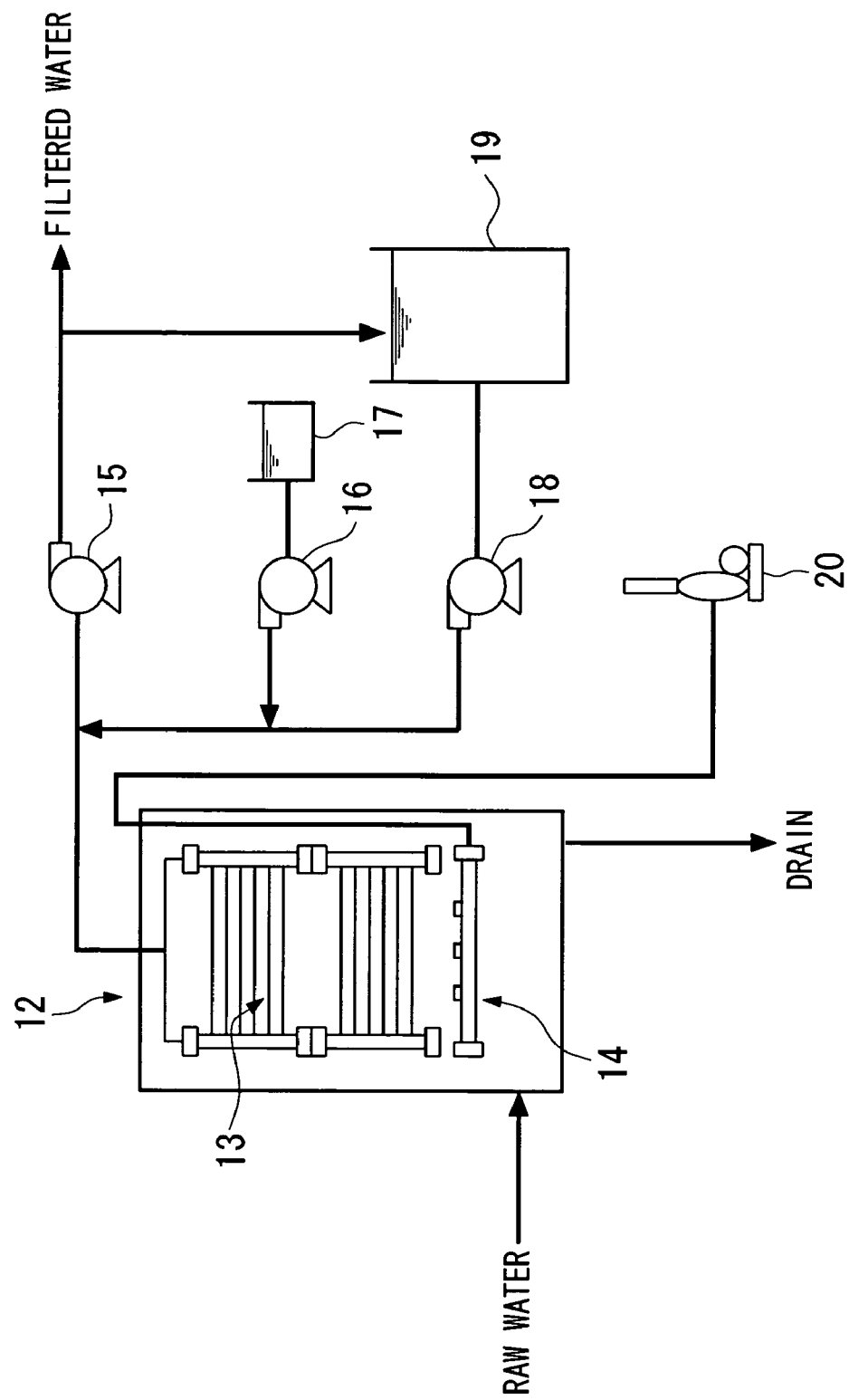
FIG. 9 is diagram showing an example of a flow in membrane filtration device of the present invention.

FIG. 9 is a diagram showing an example of a flow in the membrane filtration device of the present invention. The membrane filtration device consists substantially of a water tank (12), a hollow fiber membrane module unit (13), an air diffusing device (14), a suction pump (15), a chemical pump (16), a chemical tank (17), a backwash pump (18), a backwash tank (19), and a blower (20).

The membrane filtration device of the present invention satisfies the following three relationships where S ($m^2$) is the membrane area of the membrane module units, A ($m^2$) is the area of projection of the membrane module units, that is the area of the membrane module units as viewed from above, V' ($m^3$) is the volume of the membrane module units and V ($m^3$) is the capacity of the water tank.

$$1000 \leq S/A \leq 2000 \tag{1}$$

$$500 \leq S/V' \leq 800 \tag{2}$$

$$0.70 \leq V'/V \leq 0.99 \tag{3}$$

The volume V' is the volume enclosed by the outer surface of the membrane module unit including empty space within the membrane module unit where no members are present.

The method of operating a membrane filtration device according to the present invention will now be described. The hollow fiber membrane module unit (13) is installed in the water tank (12). The hollow fiber membrane module unit (13) has the air diffusing device (14) provided at the bottom thereof. Filtrate is produced by running the suction pump (15), with a part of the filtrate stored in the backwash tank (19). After a predetermined period of filtration, scrubbing cleaning is performed using air supplied by the blower (20) that is connected to the air diffusing device (14), and backwashing is carried out by the backwash pump (18) using the filtrate that is supplied from the backwash tank (19). At this time, a chemical supplied from the chemical tank (17) is injected by the chemical pump (16) into the backwash water. The backwash water is discharged to the outside of the submerging water tank through an effluent port (not shown) provided at the top of the submerging water tank. Cleaning by scrubbing and backwashing may be carried out separately.

After cleaning, the liquid in the water tank (12) is drained from the bottom thereof. Draining of water may not necessarily be carried out every time cleaning is performed, but may be carried out once after cleaning several times. Hereinafter, the number of cleaning operations before draining of water will be referred to as the number N of cycles per draining of water. The cleaning operation herein refers to the cleaning carried out after stopping filtration and before starting the next run of filtration.

One cleaning operation will be counted either when scrubbing cleaning and backwashing are carried out simultaneously, or when scrubbing cleaning and backwashing are carried out separately. Even when a plurality of cleaning processes are repeated in such a sequence as scrubbing cleaning, backwashing, scrubbing cleaning then backwashing, this series of cleaning processes will be counted as one cleaning operation as long as these processes are carried out after stopping filtration and before starting the next run of filtration.

The cleaning may be performed either by scrubbing cleaning or backwashing only. In a sequence of operation cycles, cleaning may be performed either by carrying out only scrubbing cleaning or backwashing, or by combining scrubbing cleaning and backwashing. For example, the membrane filtration device may be operated in a sequence of (i) filtration, (ii) scrubbing cleaning, (iii) filtration, (iv) backwashing, and (v) draining of water, in which case the number of cycles per draining of water is 2.

In another example, the membrane filtration device may be operated in a sequence of (i) filtration, (ii) scrubbing cleaning, (iii) filtration, (iv) scrubbing cleaning, (v) backwashing, (vi) filtration, (vii) scrubbing cleaning and backwashing combined, and (viii) draining of water, in which case the number of cycles per draining of water is 3.

Figure 10:
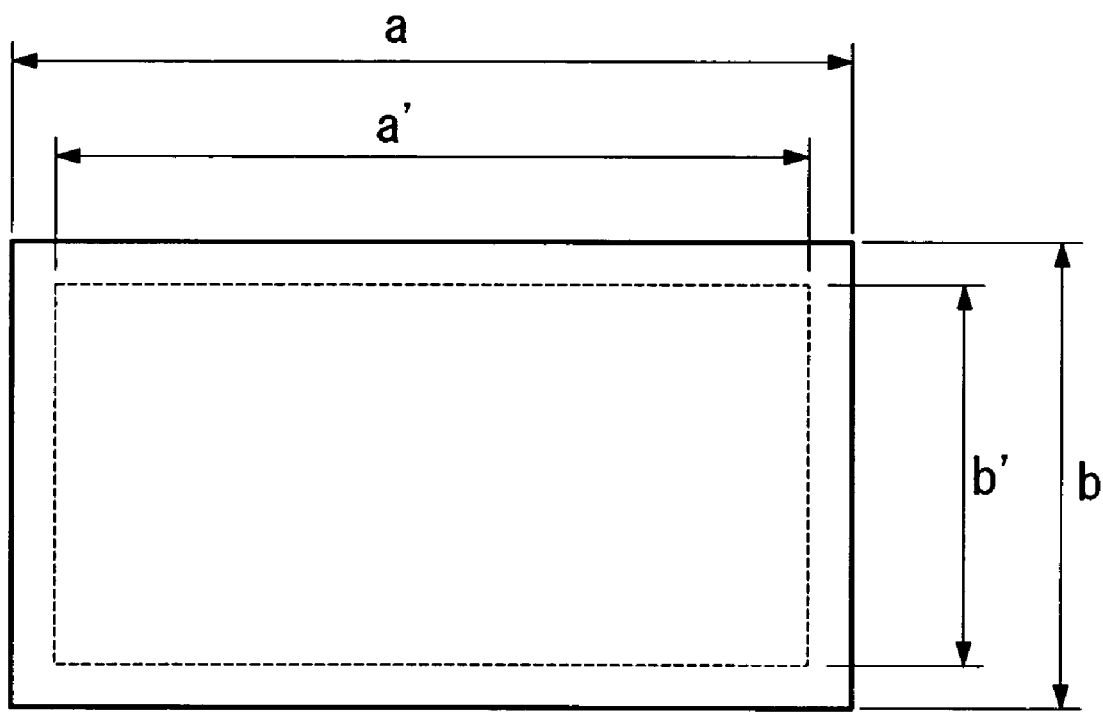
FIG. 10 is a schematic view showing an example of the bottom of submerging water tank of the membrane filtration device according to the present invention.

FIG. 10 is a schematic diagram showing an example of water tank bottom in the membrane filtration device of the present invention, where the solid line shows the outline of the inside of the water tank at the bottom, and the dashed line shows the outline of the outer diameter of the hollow fiber membrane module unit.

Areal efficiency and volumetric efficiency of the membrane module units will now be described. Areal efficiency is given by dividing the membrane area S of the membrane module units by the projection area A of the membrane module units (the area a' (m)×b' (m) in the example shown in FIG. 10). Volumetric efficiency is given by dividing the membrane area S of the membrane module units by the volume V' ($m^3$) of the unit (the volume a' (m)×b' (m)×height of unit (m: not shown) in the example shown in FIG. 10).

Capacity V ($m^3$) of the submerging water tank is given by a (m)×b (m)×effective depth of water (m: not shown) in the example shown in FIG. 10.

In the membrane filtration device of the present invention, areal efficiency S/A of the hollow fiber membrane module unit is preferably in a range from 1000 to 2000 ($m^2/m^2$) and more preferably in a range from 1100 to 1800 ($m^2/m^2$). While areal efficiency can be adjusted by changing the number of units stacked, the unit cannot be made compact when the unit is constituted by stacking a small number of levels and areal efficiency is lower than 1000 ($m^2/m^2$). When the unit is constituted by stacking a large number of levels and areal efficiency is higher than 2000 ($m^2/m^2$), for example in the case in which the air diffusing device is installed only at the bottom of the unit, on the other hand, bubbles may not be distributed throughout the membrane located high in the unit, thus resulting in insufficient cleaning.

In the membrane filtration device of the present invention, volumetric efficiency S/V' of the membrane module units is preferably in a range from 500 to 800 ($m^2/m^3$) and more preferably in a range from 600 to 700 ($m^2/m^3$). When volumetric efficiency S/V' is lower than 500 ($m^2/m^3$), the device becomes larger. When volumetric efficiency S/V' is higher than 800 ($m^2/m^3$), efficiency of cleaning decreases.

In the membrane filtration device of the present invention, capacity V ($m^3$) of the submerging water tank and volume V' ($m^3$) of the membrane module unit preferably satisfy the relationship $0.70 \leq V'/V \leq 0.99$. When the ratio V'/V is lower than 0.70, dead space becomes larger, which decreases the water recovery ratio. When the ratio V'/V is higher than 0.99, on the other hand, clearance between the submerging water tank and the unit installed in the submerging water tank becomes smaller, thus giving rise to the possibility of breaking the unit when installing it.

According to the method of operating a filtration device of the present invention, membrane area S ($m^2$) of the membrane module unit, filtration flux J (m/d) that is the quantity of filtered water ($m^3$/D) divided by the membrane area S ($m^2$), filtration time T (h), the number of cycles per draining of water N, quantity of drained water per one cycle D ($m^3$), backwash flux J' (m/d) that is the quantity of backwash water ($m^3$/D) divided by the membrane area S ($m^2$) and backwash time T' (h) satisfy the following relationship.

$$N \geq 22.8D/\{S(0.05JT - J'T')\}$$

Water recovering ratio Q (%) is given by the following equation.

$$Q = \{(\text{Quantity of filtered water} - \text{Quantity of backwash water})/(\text{Quantity of raw water supply})\} \times 100 = \{(S \times J \times T/24 \times N - S \times J' \times T'/24 \times N) \times (S \times J \times T/24 \times N + D)\} \times 100$$

While the water recovering ratio Q (%) is dependent on various factors, it is affected particularly heavily by the number N of cycles per draining of water. When it is assumed that water recovering ratio Q (%)$\geq$95, the relationship described above that defines N becomes as follows.

$$N \geq 22.8D/\{S(0.05JT - J'T')\}$$

In a purification plant having a large capacity, quantity of drainage is large and the water recovery ratio becomes more important. Therefore, the value of the number of cycles per draining of water N is determined by the relationship described above, so as to achieve a high water recovering ratio of 95% or higher.

While the filtration flux J (m/d) can be determined in consideration of the raw water quality, it is preferably in a range from 0.25 to 2.5 m/d. When filtration flux is less than 0.25 m/d, filtration must be continued for a very long period of time and, when filtration flux is more than 2.5 m/d, suction pressure may become high at an early stage.

While filtration time T (h) can be determined in consideration of the raw water quality, it is preferably, for example, in a range from 15 to 240 minutes, more preferably from 30 to 120 minutes. When the filtration time is shorter than 15 minutes, water recovering ratio and rate of operation become low. When filtration time is longer than 180 minutes, cleaning restoration performance of the suction pressure may become lower.

While the quantity of scrubbing air, that is, the quantity of air per unit projection area of the membrane module units may also be determined appropriately, it is preferably, for example, in a range from 100 to 400 ($Nm^3/(m^2 \cdot h)$), more preferably in a range from 150 to 250 ($Nm^3/(m^2 \cdot h)$). When the quantity of air is less than 100 ($Nm^3/(m^2 \cdot h)$), effect of cleaning decreases. When the quantity of air is more than 400 ($Nm^3/(m^2 \cdot h)$), there is a tendency that supply of excessively large quantity of air is required.

While the scrubbing cleaning time may also be determined appropriately, it is preferably, for example, in a range from 1 to 10 minutes, more preferably from 2 to 5 minutes. When the scrubbing cleaning time is less than 1 minute, cleaning effect becomes insufficient. When the scrubbing time is longer than 10 minutes, rate of operation becomes low.

While backwash flux J' (m/d) may also be determined appropriately, it is preferably, for example, in a range from 0.3 to 4 times the filtration flux, more preferably in a range from 1 to 3 times the filtration flux. When backwash flux is less than 0.3 times the filtration flux, cleaning effect becomes insufficient. When backwash flux is longer than 4 times the filtration flux, water recovering ratio becomes low.

While the backwash time T' (h) may also be determined appropriately, it is preferably, for example, in a range from 5 to 180 seconds, more preferably from 10 to 90 seconds. When the backwash time is less than 5 seconds, cleaning effect becomes insufficient. When the backwash time is longer than 90 seconds, water recovering ratio and rate of operation become low.

While chemical injected during backwashing may be selected as required, for example, sodium hypochlorite aqueous solution may be used. Concentration of the injected chemical may also be determined appropriately, but it is preferably, for example, in a range from 1 to 100 mg/L (concentration in backwash water), more preferably in a range from 2 to 50 mg/L. Chemicals may not necessarily be injected, or may be injected as required.

The number of cycles per draining of water N may be set to one for every backwashing, or one for several backwash operations. Preferably, drainage is performed, for example, once per every one to four backwash operations, more preferably once per every one or two backwash operations. When drainage is performed less than once per four backwash operations, suction pressure may increase prematurely.

TEST EXAMPLES

The present invention will now be described in more detail below by way of Test Examples. Production of hollow fiber membrane module Test Example 1

A hollow fiber membrane made from porous hydrophilic polyethylene (product name EX540T, inner diameter 350 μm, outer diameter 540 μm, made of polyethylene manufactured by Mitsubishi Rayon Co., Ltd.) was used to make the sheet-form hollow fiber membrane by folding a bundle of 16 hollow fiber membranes and weaving the folded hollow fiber membranes with stitching threads (fabric width 950 mm, number of bundled threads: 70).

27 sheets of the sheet-form hollow fiber membrane were stacked at 6 mm pitch (the pitch refers to the distance between centers of the sheet-form hollow fiber membranes) by inserting fabric spacers, and inserted into a housing made of ABS resin having rectangular parallelepiped section at one end where hollow fiber membrane is exposed and cylindrical section at one end where hollow fiber membrane opens (inner diameter of cylindrical section 124 mm). Then 1.5 kg of a potting resin C4403/N4221 (two-pack curing type polyurethane resin manufactured by Nippon Polyurethane Industry Co., Ltd.) was injected to bond and fasten the sheet-form hollow fiber membrane onto the housing.

The sheet-form hollow fiber membrane was bonded and fastened similarly onto the housing also on the other end. Then hollow fiber membranes were cut at both ends so as to become open, thereby producing the hollow fiber membrane module having the structure shown in FIG. 4 (membrane area 34 $m^2$, W=173 mm, D=124 mm, L=50 mm, length of hollow fiber membrane anchoring section of rectangular parallelepiped section 20 mm, L/D=0.40, W/D=1.40).

Test Example 2

The hollow fiber membrane module was produced similarly to Test Example 1 except for using 1.3 kg of the potting resin (membrane area 37 $m^2$, W=173 mm, D=124 mm, L=35 mm, length of hollow fiber membrane anchoring section of rectangular parallelepiped section 20 mm, L/D=0.28, W/D=1.40).

Test Example 3

The hollow fiber membrane made from porous hydrophilic polyethylene (product name EX780T, inner diameter 500 μm, outer diameter 770 μm, made of polyethylene manufactured by Mitsubishi Rayon Co., Ltd.) was used to make sheet-form hollow fiber membrane by folding a bundle of 6 hollow fiber membranes and weaving the folded hollow fiber membranes with stitching threads (fabric width 950 mm, number of bundled threads: 82).

30 sheets of the sheet-form hollow fiber membrane were stacked at 6 mm pitch by inserting fabric spacers, and inserted into a housing made of ABS resin having rectangular parallelepiped section at one end where hollow fiber membrane is exposed and cylindrical section at one end where hollow fiber membrane opens (inner diameter of cylindrical section 145 mm). Then 1.7 kg of the potting resin the same as that of Test Example 1, was injected to bond and fasten the sheet-form hollow fiber membrane onto the housing. Then the hollow fiber membranes were cut at the end so as to become open, thereby producing the hollow fiber membrane module having the structure-shown in FIG. 5 (membrane area 30 $m^2$, W=232 mm, D=145 mm, L=60 mm, length of hollow fiber membrane anchoring section of rectangular parallelepiped section 30 mm, L/D=0.41, W/D=1.60).

Test Example 4

The sheet-form hollow fiber membrane was produced similarly to Test Example 1, except for changing the fabric width to 1200 mm and the number of bundled threads to 167.

27 sheets of the sheet-form hollow fiber membrane were stacked at 12 mm pitch by inserting fabric spacers, and one end thereof was inserted into a potting fixture made of silicon resin having rectangular parallelepiped shape on the side where the hollow fiber membrane is exposed and cylindrical shape on the side where the hollow fiber membrane opens (inner diameter 250 mm). Then 5.2 kg of the potting resin similar to that of Test Example 1 was injected to bond and fasten the sheet-form hollow fiber membrane.

The sheet-form hollow fiber membrane was also bonded and fastened similarly on the other end. Then the hollow fiber membranes were cut at both ends so as to become open, thereby producing the hollow fiber membrane module having the structure shown in FIG. 1 (membrane area 90 m$^2$, W=425 mm, D=250 mm, L=150 mm, length of hollow fiber membrane anchoring section of rectangular parallelepiped section 50 mm, L/D=0.60, W/D=1.70).

Comparative Example 1

A hollow fiber membrane module was produced similarly to Test Example 1, except for using a housing having rectangular parallelepiped shape ranging from the end where the hollow fiber membrane is exposed to the other end where the hollow fiber membrane opens (pressure receiving area measuring 121 mm on the longer side and 100 mm on the shorter side: same as the pressure receiving area of the cylindrical section in Test Example 1) and applying 2.0 kg of potting resin (membrane area 35 m$^2$, anchoring member measuring 121 mm on the longer side and 100 mm on the shorter side, with length of hollow fiber membrane anchoring section 70 mm).

Repetitive Pressure Endurance Test of Hollow Fiber Membrane Module

Repetitive pressure endurance test was conducted on the hollow fiber membrane module made in Test Examples 1 to 4 and Comparative Example 1.

Test samples for the repetitive pressure endurance test were made by cutting off the hollow fiber membrane from the hollow fiber membrane module and sealing the open end of the hollow fiber membrane with the potting resin. The test samples were set on a repetitive pressure endurance test device, and were subjected to a repetition of application and removal of pressure on the end of the module, to determine the number of pressure cycles before leakage occurred in the sample (temperature 40° C., pressure 350 kPa, ON for 30 seconds and OFF for 30 seconds per cycle, pressure applied on the end of module, number of cycles 5000 at maximum). Test results are shown in Table 1.

TABLE 1

| | Test Example 1 | Test Example 2 | Test Example 3 | Test Example 4 | Comparative Example 1 |
| --- | --- | --- | --- | --- | --- |
| No. of cycles | 5000 (No leak) | 5000 (No leak) | 5000 (No leak) | 5000 (No leak) | 1530 (Crack in potting surface) |

It is clear from the results of the repetitive pressure endurance test that the hollow fiber membrane module of the present invention has a high withstand pressure.

Production of Hollow Fiber Membrane Module Unit

Test Example 5

A hollow fiber membrane module unit (membrane area 136 m$^2$) having a structure shown in FIG. 6 was made by using the hollow fiber membrane module made in Test Example 1. Furthermore, the hollow fiber membrane module unit having a structure shown in FIG. 8 with an air diffusing device provided at the bottom was made by stacking the hollow fiber membrane module units in 6 levels in the vertical direction (membrane area 816 m$^2$, a'=1.2 m, b'=0.4 m, unit height 2.637 m, areal efficiency S/A=1700 m$^2$/m$^2$, unit volume V'=1.266 m$^3$, volumetric efficiency S/V'=645 m$^2$/m$^3$).

Test Example 6

A hollow fiber membrane module unit was made similarly to that for Test Example 5 except for stacking hollow fiber membrane module units in four levels in the vertical direction (membrane area 544 m$^2$, a'=1.2 m, b'=0.4 m, unit height 1.797 m, areal efficiency S/A=1133 m$^2$/m$^2$, V'=0.863 m$^3$, volumetric efficiency S/V'=630 m$^2$/m$^3$).

Filtration Test

Test Example 7

The hollow fiber membrane module unit made in Test Example 5 was installed in the membrane filtration device shown in FIG. 9 (a=1.21 m, b=0.41 m, effective water depth 2.637 m, V=1.31 m$^3$, V'/V=0.97).

The membrane filtration device described above was subjected to underflow water filtration test for 10 days, to observe the change in the suction pressure. Test conditions are shown in Table 2 and the results are shown in Table 3.

Test Example 8

The underflow water filtration test was conducted similarly to Test Example 7 except for setting the tank to a=1.3 m, b=0.5 m, effective water depth to 2.637 m, V=1.71 m$^3$ and V'/V=0.74. Test conditions are shown in Table 2 and the results are shown in Table 3.

Test Example 9

The hollow fiber membrane module unit made in Test Example 6 was installed in the membrane filtration device shown in FIG. 9 (a=1.21 m, b=0.41 m, effective water depth 1.797 m, V'/V=0.97). The membrane filtration device described above was subjected to underflow water filtration test for 10 days, to observe the change in the suction pressure. Test conditions are shown in Table 2 and the results are shown in Table 3.

Test Example 10

The underflow water filtration test was conducted similarly to Test Example 9 except for setting the tank to a=1.3 m, b=0.5 m, effective water depth to 1.797 m, V=1.17 m$^3$ and V'/V=0.74. Test conditions are shown in Table 2 and the results are shown in Table 3.

Comparative Example 2

The underflow water filtration test was conducted similarly to Test Example 7 except for setting the tank to a=1.5 m, b=0.7 m, effective water depth to 2.637 m, V=2.77 m$^3$ and V'/V=0.46. Test conditions are shown in Table 2 and the results are shown in Table 3.

Comparative Example 3

The underflow water filtration test was conducted similarly to Test Example 9 except for setting the tank to a=1.5 m, b=0.7 m, effective water depth to 1.797 m, V=1.89 m$^3$ and V'/V=0.46. Test conditions are shown in Table 2 and the results are shown in Table 3.

TABLE 2

| | | | Test Examples | | | | Comparative Examples | |
|---|---|---|---|---|---|---|---|---|
| | | | 7 | 8 | 9 | 10 | 2 | 3 |
| Areal efficiency (m²/m²) | | | 1,700 | | 1,133 | | 1,700 | 1,133 |
| Volumetric efficiency (m²/m³) | | | 645 | | 630 | | 645 | 630 |
| | V/V' | | 0.97 | 0.74 | 0.97 | 0.74 | 0.46 | 0.46 |
| Filtration | J (m/d) | | 2.0 | | 0.5 | | 2.0 | 0.5 |
| | T (h) | | 1 | | | | 1 | |
| Cleaning | Scrubbing | Air flow rate (Nm³/(m²/h)) | 200 | | | | | |
| | | Duration (h) | 2 | | | | | |
| | Back-washing | J' (m/d) | 4.0 | | 1.0 | | 4.0 | 1.0 |
| | | T' (h) | 0.00833 | | | | | |
| Draining | | D (m³) | 1.07 | 0.47 | 0.731 | 1.01 | 2.53 | 1.73 |
| | | Number of cycles per draining of water N | 1 | 1 | 2 | 3 | 1 | 4 |

TABLE 3

| | Test Examples | | | | Comparative Examples | |
|---|---|---|---|---|---|---|
| | 7 | 8 | 9 | 10 | 2 | 3 |
| Suction pressure immediately after starting test$_{20° C.}$ (kPa) | 28.0 | 28.0 | 15.0 | 15.0 | 28.0 | 15.0 |
| Suction pressure after end of test$_{20° C.}$ (kPa) | 30.0 | 29.7 | 15.5 | 15.4 | 29.6 | 15.3 |
| Water recovering ratio (%) | 96.8 | 96.3 | 95.3 | 95.5 | 94.8 | 94.7 |

The results of the filtration test show that the membrane filtration device of the present invention achieves a water recovery ratio as high as 95% or higher while maintaining stable suction pressure during operation.

The hollow fiber membrane module, the hollow fiber membrane module unit, the membrane filtration device and the method of operating the same according to the present invention are used for purification of a potable water supply, purification of waste water, industrial processes or the like. In the hollow fiber membrane module of the present invention, since the end face of the anchoring member (2) on the side where the hollow fiber membrane is exposed is substantially rectangular, and the end face of the anchoring member (2) on the side where the hollow fiber membrane opens is substantially circular, withstand pressure of the hollow fiber membrane anchoring section does not decrease even when the membrane area is increased in a module that employs the sheet-form hollow fiber membrane having high efficiency of cleaning. In the hollow fiber membrane module unit of the present invention, since the plate-like member (5) that has a hole through which the cylindrical section (4) passes is provided so that the hollow fiber membrane modules are secured in place by the plate-like member (5), easy and reliable anchoring is ensured while improving the density of the hollow fiber membranes. The membrane filtration device of the present invention that includes a plurality of the hollow fiber membrane modules of the present invention and is operated by the operation method of the present invention has a large membrane area in spite of very compact construction and allows efficient cleaning, and therefore stable filtration can be continued over a long period of time.

What is claimed is:

1. A hollow fiber membrane module unit comprising:
   a plurality of hollow fiber membrane modules, wherein a said hollow fiber membrane module comprises:
   a plurality of sheet-form hollow fiber membranes; and
   an anchoring member that fastens the plurality of sheet-form hollow fiber membranes substantially parallel to each other while leaving at least one end of the sheet-form hollow fiber membranes open,
   wherein the anchoring member comprises having a first side and an opposing second side, a rectangular parallelepiped section having a substantially rectangular parallelepiped shape on the first side where the outer surfaces of the hollow fiber membranes are exposed, and a cylindrical section having a substantially cylindrical shape on the second side and having an exposed second end face, where the at least one end of the hollow fiber membranes left open is at said second end face,
   wherein a plate-like member having a hole through which the cylindrical section passes is provided on a side of the sheet-form hollow fiber membranes perpendicular to sheet surfaces, so that the hollow fiber membrane modules are secured in place by the plate-like member, and
   wherein said unit includes a water collecting cap that engages with the cylindrical section, wherein the plate-like member is sandwiched between the cylindrical section and the water collecting cap.

2. The hollow fiber membrane module unit according to claim 1, wherein the cylindrical section and the water collecting cap are fastened to each other by screw engagement.

3. The hollow fiber membrane module unit according to claim 1, wherein a plurality of hollow fiber membrane module units are stacked in the vertical direction,
   the sheet surfaces of the sheet-form hollow fiber membranes are disposed in the vertical direction, and water collecting caps adjoin each other in the vertical direction and are connected to each other by a water collecting member that extends in the vertical direction, and a side frame is disposed on a side face parallel to the sheet surfaces of the sheet-form hollow fiber membranes.

4. The hollow fiber membrane module unit according to claim 3, wherein vertical distance between the sheet-form hollow fiber membranes of the hollow fiber membrane module adjacent to each other in the vertical direction is 70 mm or less.

* * * * *

UNITED STATES PATENT AND TRADEMARK OFFICE
CERTIFICATE OF CORRECTION

PATENT NO. : 7,294,267 B2 Page 1 of 1
APPLICATION NO. : 11/087593
DATED : November 13, 2007
INVENTOR(S) : Takeda et al.

It is certified that error appears in the above-identified patent and that said Letters Patent is hereby corrected as shown below:

On the Title Page Item -75-

(75) Inventors: Satoshi TAKEDA, delete "Tokyo" and insert --Toyohashi-shi--
Ikuo KINOSHITA, delete "Toyohashi-shi" and insert --Tajimi-shi--

Signed and Sealed this

Tenth Day of June, 2008

JON W. DUDAS
*Director of the United States Patent and Trademark Office*